No. 862,614. PATENTED AUG. 6, 1907.
C. E. DAVEY.
VALVE.
APPLICATION FILED MAR. 12, 1903.
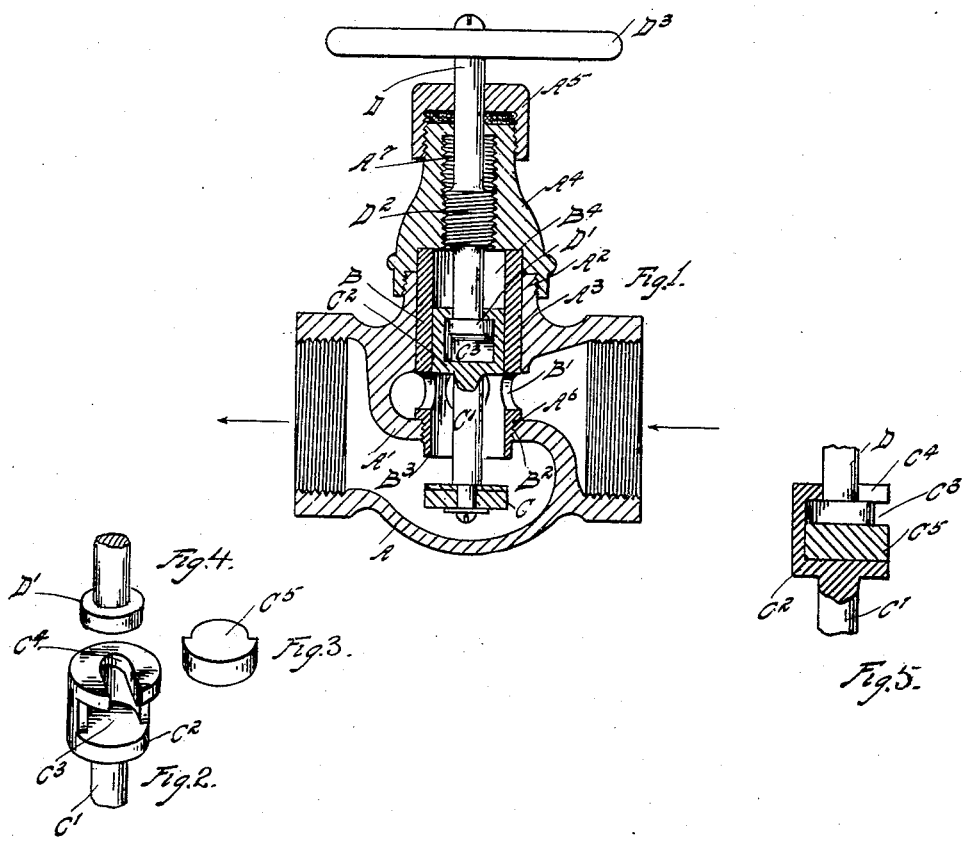
WITNESSES
Lotta Lee Hayton.
T. H. Massey.
INVENTOR
Charles E. Davey
By Parker & Burton
Attorneys.
THE NORRIS PETERS CO., WASHINGTON, D. C.

UNITED STATES PATENT OFFICE.

CHARLES E. DAVEY, OF DETROIT, MICHIGAN.

VALVE.

No. 862,614.      Specification of Letters Patent.      Patented Aug. 6, 1907.

Application filed March 12, 1903. Serial No. 147,374.

*To all whom it may concern:*

Be it known that I, CHARLES E. DAVEY, a citizen of the United States, residing at Detroit, county of Wayne, State of Michigan, have invented a certain new and useful Improvement in Valves, and declare the following to be a full, clear, and exact description of the same, such as will enable others skilled in the art to which it pertains to make and use the same, reference being had to the accompanying drawings, which form a part of this specification.

My invention relates to valves, and the object of my improvements is to provide an improved valve adapted to act as a check valve or positive closed valve. This improved valve may be transformed into a valve operable only by manipulation. I secure this object in the valve illustrated in the accompanying drawing, in which,—

Figure 1, is a cross section. Figs. 2, 3 and 4, are details of the parts forming the joint between the two parts of the valve stem. Fig. 5 is a section of the joint between the two parts of the valve stem with the block in place which takes up the lost motion between said parts of the valve stem, so that the valve can be operated as a simple hand actuated valve.

A, is the valve casing, having formed therein the usual partition $A^1$.

$A^2$, is a nipple extending above the valve casing A screw-threaded on the outside and having a cylindrical opening $A^3$ therein. Axially in line with the opening $A^3$ is a screw-threaded opening $A^6$ in the partition $A^1$.

B, is a cylinder having a cylindrical opening $B^4$ in its upper portion and having a valve seat $B^3$ formed at its lower end. The cylinder B is adapted at $B^2$ to screw into the opening $A^6$, the valve seat at its lower end extending below the partition $A^1$.

$A^4$, is a cap adapted to screw upon the nipple $A^2$ to close the opening $A^3$.

$B^1$, indicates holes through the walls of the cylinder B at the part of said walls that come just above the partition $A^1$.

C, is a valve disk adapted to seat upwards against the valve seat $B^3$.

$C^1$, is a valve stem extending upward from the valve C into the cylinder B and provided at its upper end with a cylindrical portion $C^2$ adapted to fit and slide in the cylinder B. The lower end of this cylindrical portion is exposed to the pressure of the fluid in the valve casing, which has a tendency to close the valve when the pressure in the casing increases. The cylindrical portion $C^2$ of the valve stem $C^1$ has a chamber $C^3$ formed therein and is cut away at one side to form an entrance to the chamber $C^3$, as most distinctly indicated in Fig. 2.

$C^4$, is a slot extending inward from the periphery of the upper end of the cylindrical portion $C^2$ of the valve stem $C^1$.

D, is a spindle extending axially in line with the valve stem $C^1$, its lower end extending into the slot $C^4$.

$D^1$, is a disk, or enlargement on the end of the spindle D within the chamber $C^3$, but of less thickness than the height of said chamber. The upper surface of the disk $D^1$, is adapted to engage against the upper end of the cylindrical portion $C^2$, of the valve stem $C^1$ and against the lower end of said cylindrical portion leaving some distance between these two engagements, thus the spindle D is engaged with the valve stem $C^1$ so that it may turn independent thereof and so that it will have considerable lost motion in the direction of the axes of said valve stem and spindle.

$C^5$, is a block adapted to be inserted within the chamber $C^3$ under the disk $D^1$, to prevent any lost motion between the valve stem $C^1$ and spindle D in the direction of their axes. The joint between the valve stem with the block $C^5$ in place is shown in Fig. 5.

$A^5$, is a gland surrounding the spindle D, its threads engaging with threads upon the cap $A^4$ and forming a tight joint around said spindle.

$D^2$, are screw threads upon the spindle D adapted to engage with screw threads $A^7$ in the cap $A^4$.

$D^3$, is a hand wheel on the outer end of the spindle D.

The operation of the above described device is as follows:—When the spindle D is turned so as to draw the valve C firmly against its seat, the valve is closed so as to prevent passage of water in the direction indicated by the arrow in Figs. 1 and 2. When the spindle D is turned by means of the wheel $D^3$ so as to bring it to a lower and intermediate position, the valve C is free to open to a pressure having that tendency but acts as a check or non-return valve to prevent the passage of fluid under a back pressure. When the spindle D is turned to its lowest position, the disk $D^1$ strikes against the upper end of the stem $C^1$ or the lower end of the cylindrical portion $C^2$ forcing the valve C away from its seat and holding it away from its seat as long as the spindle D is in this position. When the block $C^5$ is inserted in the chamber $C^3$ under the disk $D^1$, the spindle D is free to turn independently of the valve stem $C^1$, but cannot move in the direction of its axis without carrying the stem $C^1$ and the valve C along with it so that with this arrangement the valve C is no longer adapted to act as a check valve but the spindle D and stem $C^1$ form substantially a single stem except that they may be rotated independently of each other, and the valve is adapted to be operated only by hand.

The above device may obviously be applied to a faucet without departing from my invention.

By the above construction the valve is accurately guided by a stationary guide and is readily and cheaply constructed to accurately fit the guide, and the construction which adapts the valve stem to the guide affords facilities for the joint between the spindle and the stem.

What I claim is:—

The combination of a casing having a valve seat surrounding a port therein and provided with a passage in line with said port adapted to act as a guideway, a valve disk adapted to seat upon said valve-seat, a stem extending from said disk and provided with an enlargement at its end remote from the valve disk, said enlargement being adapted to slide in, and engage with the walls of said passage and having a chamber formed therein, a spindle extending into said chamber and provided with an enlargement in said chamber of less thickness than the height of said chamber, said chamber being open at one side, and a block adapted to be inserted through said opening into said chamber under the end of said spindle and retained therein by the walls of said passage.

In testimony whereof, I sign this specification in the presence of two witnesses.

CHARLES E. DAVEY.

Witnesses:
ELLIOTT J. STODDARD,
ROBERT C. RUDY.